(12) United States Patent
Pinard et al.

(10) Patent No.: US 6,230,287 B1
(45) Date of Patent: May 8, 2001

(54) WEB BASED HELP DESK

(75) Inventors: Debbie Pinard; Ron Evans, both of Kanata; Serguei Mankovskii, Carp, all of (CA)

(73) Assignee: Mitel Corporation, Ontario (CA)

( * ) Notice: Subject to any disclaimer, the term of this patent is extended or adjusted under 35 U.S.C. 154(b) by 0 days.

(21) Appl. No.: 09/145,919

(22) Filed: Sep. 3, 1998

Related U.S. Application Data

(60) Provisional application No. 60/057,495, filed on Sep. 4, 1997.

(30) Foreign Application Priority Data

Sep. 4, 1997 (GB) .................................................. 9718823

(51) Int. Cl.$^7$ ..................................................... G06F 11/00
(52) U.S. Cl. ............................................... 714/31; 379/265
(58) Field of Search ................................. 714/31, 39, 41, 714/46, 47, 4; 379/265, 96, 113, 219; 713/201; 707/102, 104, 10, 9

(56) References Cited

U.S. PATENT DOCUMENTS

| | | | |
|---|---|---|---|
| 4,949,248 | 8/1990 | Caro | 364/200 |
| 5,077,790 | 12/1991 | D'Amico et al. | 380/23 |
| 5,367,667 | 11/1994 | Wahlquist et al. | 395/575 |
| 5,404,295 | 4/1995 | Katz et al. | 364/419.19 |
| 5,444,823 | 8/1995 | Nguyen | 395/51 |
| 5,526,409 | 6/1996 | Conrow et al. | 379/91 |
| 5,539,886 | 7/1996 | Aldred et al. | 395/200.04 |
| 5,621,789 | * 4/1997 | McCalmont et al. | 379/265 |
| 5,903,642 | * 5/1999 | Schwartz et al. | 379/309 |
| 5,924,069 | * 7/1999 | Kowalkowski et al. | 704/275 |
| 6,011,844 | * 1/2000 | Uppaluru et al. | 370/220 |
| 6,115,040 | * 9/2000 | Bladow et al. | 345/335 |
| 6,119,247 | * 9/2000 | House et al. | 714/38 |
| 6,144,670 | * 11/2000 | Sponaugle et al. | 370/401 |
| 6,145,001 | * 11/2000 | Scholl et al. | 709/223 |
| 6,151,601 | * 11/2000 | Papierniak et al. | 707/10 |

OTHER PUBLICATIONS

Hitachi Joho systems, Information circulation method in help dest support system using internet involves confirming enquiry information and performing amendment entry of required reply in database, Derwent, week, Acc. # 1998–578533, 1–1, Sept. 1998.*

Ri, Koto, Customer support system ultilizing internet, JPAB, Pub. #JP410340144A, 1–1, Dec. 1998.*

Samsung Electronics co., Questioning/response method of a customer support system using internet and apparatus thereof, Derwent, Acc. # 2000–449361, 1–1, Jul. 1999.*

Pacific Telephony Design, Press Release—Response Interactive, Inc., May 15, 1997.

* cited by examiner

Primary Examiner—Nadeem Iqbal
(74) Attorney, Agent, or Firm—Fenwick & West, LLP

(57) ABSTRACT

A web based help desk includes a web server having memory storing a help desk web page. The web server allows remote user computers to access the web server via an internet or intranet connection thereby to access and display the help desk web page. A plurality of computers, operated by support specialists, are in communication with the web server to allow support specialists to communicate with remote users requiring support. The support specialists are selectable through the web page. A support specialist status application monitors the status of the support specialists and remote users requesting support and prompts the web server to establish a connection between a support specialist and a remote user when a support specialist becomes available. A method of providing support to a user operating a remote computer and a help desk web page are also provided.

18 Claims, 4 Drawing Sheets

WEB BASED HELP DESK

This Appln claims benefit of Provisional No. 60/057,495 filed Sep. 4, 1997.

FIELD OF THE INVENTION

The present invention relates to computer support and in particular to a help desk accessible through a home page on the world wide web ("web").

BACKGROUND OF THE INVENTION

It is common practice for software suppliers to set up help desks so that users of the software can seek help to diagnose and solve computer software and hardware problems. In most instances, these help desks are accessible only by telephone over a public switched telephone network (PSTN). In order to gain access to the help desks, users with computer problems dial special toll free numbers to connect to the help desk and then convey information concerning the computer problems to the help desk either by voice or by DTMF dialing signals. This has limited the effectiveness of these help desks.

For example, U.S. Pat. No. 5,367,667 discloses a system for performing remote computer system diagnostic tests. A user requiring assistance calls a help desk representative via a telephone. The representative in turn creates a case file on a help desk computer. The case file includes the modem number to the user's computer, call and computer identification information. The representative also selects diagnostic tests to be run on the user's computer based on the verbal information given to the representative by the user. The representative then creates a batch job which causes the help desk computer to connect to the user's computer and instruct the user's computer to run the diagnostic tests. The telephone and computer connections between the user and the representative are then broken. When the diagnostic tests have been completed by the user's computer, the user's computer reconnects with the help desk computer and reports the results of the diagnostic tests. The representative after reviewing the results of the diagnostic tests, telephones the user and provides recommendations to solve the user's computer problems.

Help desk software has also been developed for use on local area networks (LANs) to allow a technician to diagnose and solve problems on a remote computer. For example "NETmanager" available from Brightwork Software allows a computer on a LAN to access the screen and control the keyboard of another computer on the LAN where a user of the computer is experiencing problems. This allows the technician to help remotely the user in an attempt to solve the user's computer problems.

Although help desks exist to diagnose and solve computer problems, the design of conventional help desks has limited the extent to which help can be provided to a user. Accordingly, improved help desks are desired. It is therefore an object of the present invention to provide a novel web based help desk, a novel help desk web page and a novel method of providing support to a user computer at a remote location.

SUMMARY OF THE INVENTION

According to one aspect of the present invention there is provided a web based help desk comprising:

a web server having memory for storing a help desk web page, said web server allowing remote user computers to access said web server via an Internet or Intranet connection and to access and display said web page;

a plurality of support specialists operating computers in communication with said web server to allow said support specialists to communicate with user computers requiring support, said support specialists being selectable by said user computers via said web page; and a support specialist status application monitoring the status of said support specialists and user computers requesting support and prompting said web server to establish a connection between a support specialist computer and a user computer when a support specialist becomes available.

Preferably, the web based help desk further includes an Expert System including a knowledge base to diagnose computer problems based on problem information gathered from user computers, the Expert System being selectable by user computers via the web page.

In a preferred embodiment, the web page includes an applet presenting status information concerning the support specialists and the number of users in a queue seeking access to the support specialists. The applet is updated by the support specialist status application to provide current support specialist status and queue information. The web page also presents information concerning the area of expertise of each of the support specialists. The applet allows a user to select a specific support specialist to whom the user wishes to be connected. The web page further includes links to personal web pages of the support specialists. The personal web pages present detailed biographical information concerning the support specialists.

According to another aspect of the present invention there is provided a help desk web page comprising:

support specialist information areas presenting expertise information concerning said support specialists;

a first applet presenting support specialist status and queue information, said applet being updated to provide current support specialist status and queue information and selectable by a user to allow said user to select a support specialist and/or enter said queue; and a selectable Expert System applet, said Expert System applet gathering user computer problem information when selected by said user.

According to still yet another aspect of the present invention there is provided a method of providing support to a user computer at a remote location over the Internet or Intranet comprising the steps of:

providing a web server having memory for storing a help desk web page, said web server allowing remote user computers to access said web page by way of an Internet or Intranet connection;

providing a plurality of support specialists operating computers in communication with said web server to communicate with user computers requiring support, said support specialists being selectable by way of said web page;

monitoring the status of said support specialists and user computers requesting support via said web page and establishing a socket connection between a support specialist and a user computer via said web server when a support specialist becomes available; and providing an Expert System including a knowledge base to diagnose computer problems based on gathered computer problem information, said Expert System being accessible by user computers over said Internet or Intranet connection via said web page.

The present invention provides advantages in that a user at a remote location contacting the help desk with a problem using their computer is presented with a significant amount of information as soon as the help desk is accessed. Specifically, when a user accesses the help desk, the user has access to on-line documentation, an Expert System and a variety of support specialists.

BRIEF DESCRIPTION OF THE DRAWINGS

An embodiment of the present invention will now be described more fully with reference to the accompanying drawings in which.

DETAILED DESCRIPTION OF THE PREFERRED EMBODIMENTS

Figure 1:
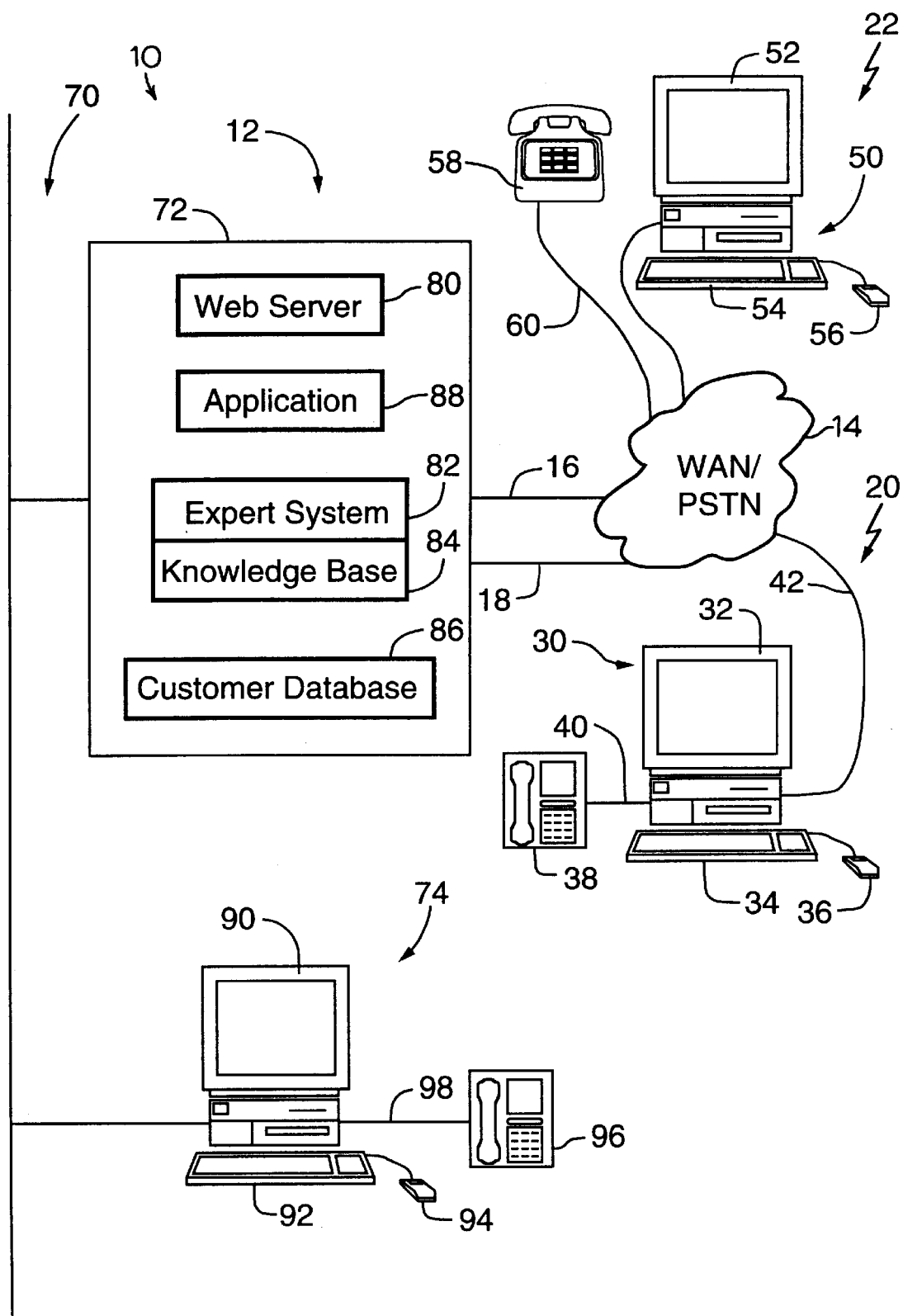
FIG. 1 is a schematic diagram of a communications system including a web based help desk in accordance with the present invention.

Referring now to FIG. 1, a communications system is shown and is generally indicated to by reference numeral 10. Communications system 10 includes a help desk 12 to provide software and hardware support to remote user computers. Help desk 12 is connected to a wide area network (WAN)/public switched telephone network (PSTN) 14 via Internet and trunk connections 16 and 18 respectively. A plurality of remote user locations 20 and 22 (only two of which are shown for illustrative purposes) are also connected to the WAN/PSTN 14. Users at the user locations 20 and 22 can establish a connection to the help desk 12 over the Internet or Intranet should the users require help to diagnose and solve software and hardware computer problems.

User location 20 includes a personal computer 30 having a monitor 32, a keyboard 34 and a mouse pointer 36 operating in a well known manner. A telephone 38 is connected to the computer by way of a universal serial bus (USB) 40. USB 40 includes a 12 Mbit/s serial interface running over a 4 wire bus with an associated software stack supporting peripheral connectivity to the personal computer 30. The personal computer 30 is connected to the WAN/PSTN 14 via an Internet connection 42.

User location 22 also includes a personal computer 50 having a monitor 52, a keyboard 54 and a mouse pointer 56. Unlike user location 20, user location 22 includes a stand alone telephone 58 connected directly to the WAN/PSTN 14 via an analog line connection 60.

The help desk 12 is implemented on a local area network (LAN) 70 and includes a server 72 and a plurality of support specialist personal computers 74 (only one of which is shown for illustrative purposes). Each support specialist personal computer 74 includes a monitor 90, a keyboard 92 and a mouse pointer 94 and is operated by a support specialist having a specific area of expertise. A telephone 96 is connected to the personal computer 74 by way of a universal serial bus (USB) 98.

The server 72 is connected to the WAN/PSTN 14 via the Internet and trunk connections 16 and 18 respectively.

Resident on the server 72 are a web server 80, an Expert System 82 and its associated knowledge base 84, a customer database 86 and a support specialist status and queue (SSSQ) application 88.

The customer database 86 stores information concerning customers using software supported by the help desk 12 such as telephone numbers, modem numbers, computer equipment as well as prior computer problem histories.

The Expert System 82 is designed to gather computer problem information input by users at the user locations 20, 22 as well as from the customer database 86. Once the Expert System 82 gathers computer problem information, the Expert System accesses the knowledge base 84 to asses the complexity and severity of the computer problem and to diagnose the computer problem. The quality of matches between the diagnosed computer problem and known problems stored in the knowledge base 84 is also determined. The Expert System 82 may be implemented using existing Expert System software such as for example OPS5 available from Carnegie Mellon University or CLIPS available from NASA. Alternatively, the Expert System can be developed using an Expert System shell such as for example VP-Expert available from Word Tech Systems Inc.

The SSSQ application 88 uses a conventional ACD/help desk queuing algorithm for managing connections between support specialist personal computers 74 and user computers 30, 50 seeking help from the help desk 12.

The web server 80 is a standard Internet or Intranet computing machine and displays help desk web pages of Hypertext Markup Language (HTML) format. HTML is a markup system used to create Hypertext documents that are portable from platform to platform. An Internet Hypertext Transfer Protocol (HTTP) allows information to be transferred between the web server 80 and the personal computers 30, 50. The web server 80 supports a Common Gateway Interface (CGI) capable of running CGI programs to mediate transactions between the web server 80 and the personal computers 30, 50.

The help desk web pages are stored in memory of the web server 80 and are made accessible to the personal computers 30, 50 at the user locations 20, 22. Users of the personal computers 30, 50 can use a standard web browser such as for example Netscape® available from Netscape Communications Corporation or Microsoft Internet Explorer® available from Microsoft Corporation to locate and access the help desk web pages. As is well known, these web browsers read HTML coded web pages so that the web pages in the memory of the web server 80 can be displayed on the monitors 32, 52 of the personal computers 30, 50.

Figure 2A:
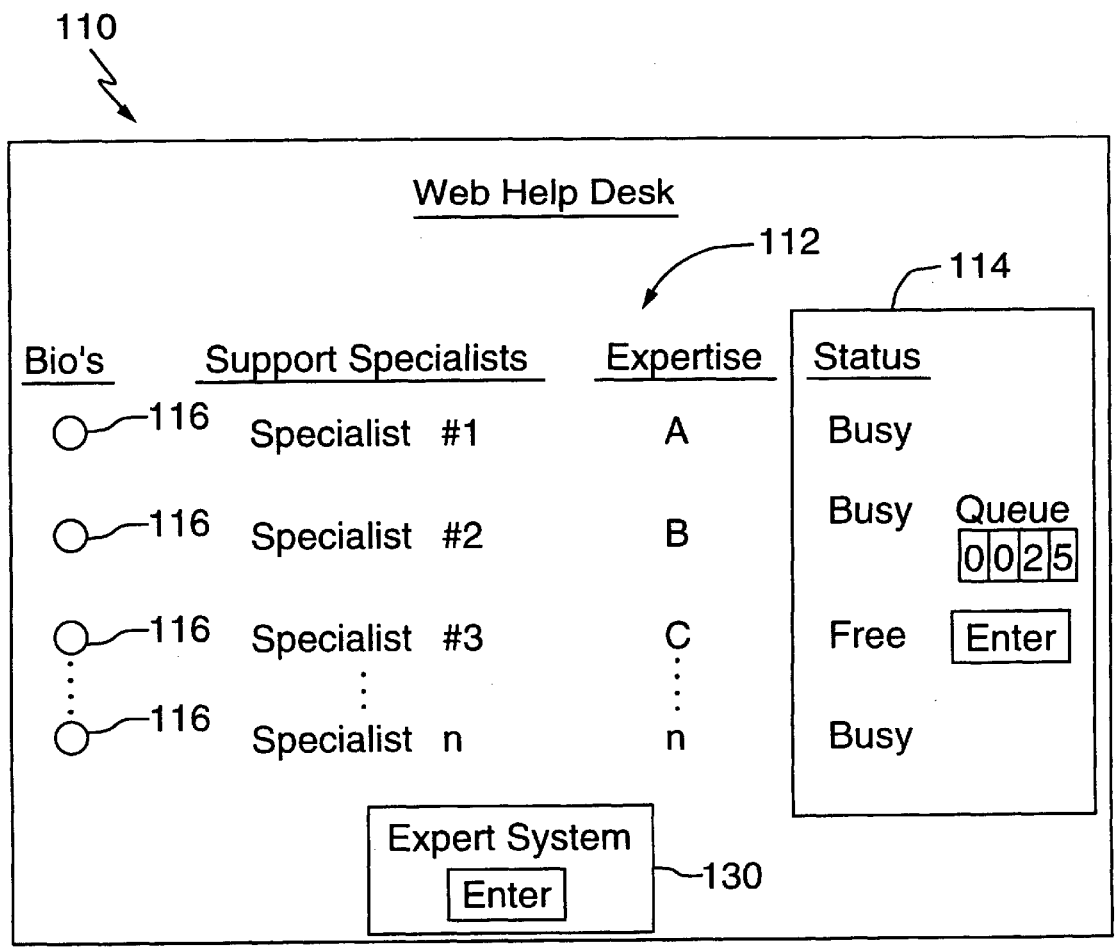
FIG. 2a is a main web page of the web based help desk accessible via the Internet or Intranet.

Referring now to FIG. 2a, the main help desk web page 110 as displayed on the monitor of a user personal computer is illustrated. As can be seen, the web page 110 includes a support specialist information area 112 presenting a list of the support specialists operating personal computers 74 and their areas of expertise as well as a SSSQ Java applet 114 which presents the status of the support specialists and the number of people in the queue waiting to be connected to a support specialist. The SSSQ Java applet 114 can be invoked by "clicking" on the applet using a mouse pointer. When the SSSQ Java applet is invoked, the user can request to be placed in the queue and if desired, to select a particular support specialist to whom the user wishes to be connected.

Figure 2B:
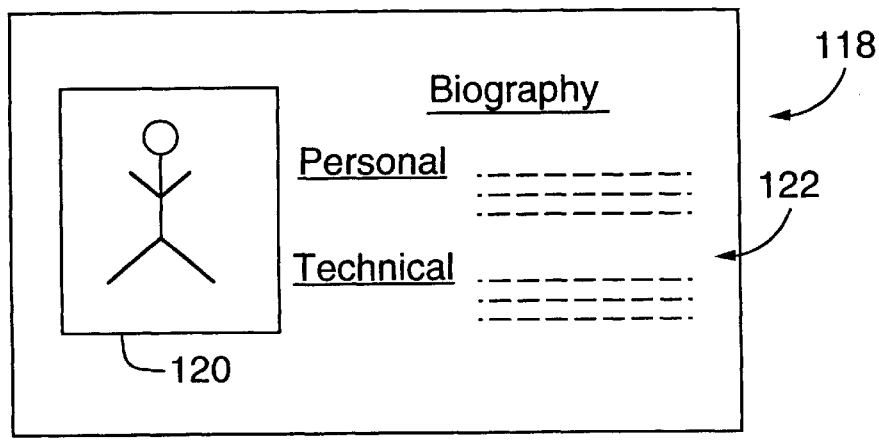
FIG. 2b is a personal web page of a support specialist.
Figure 3:
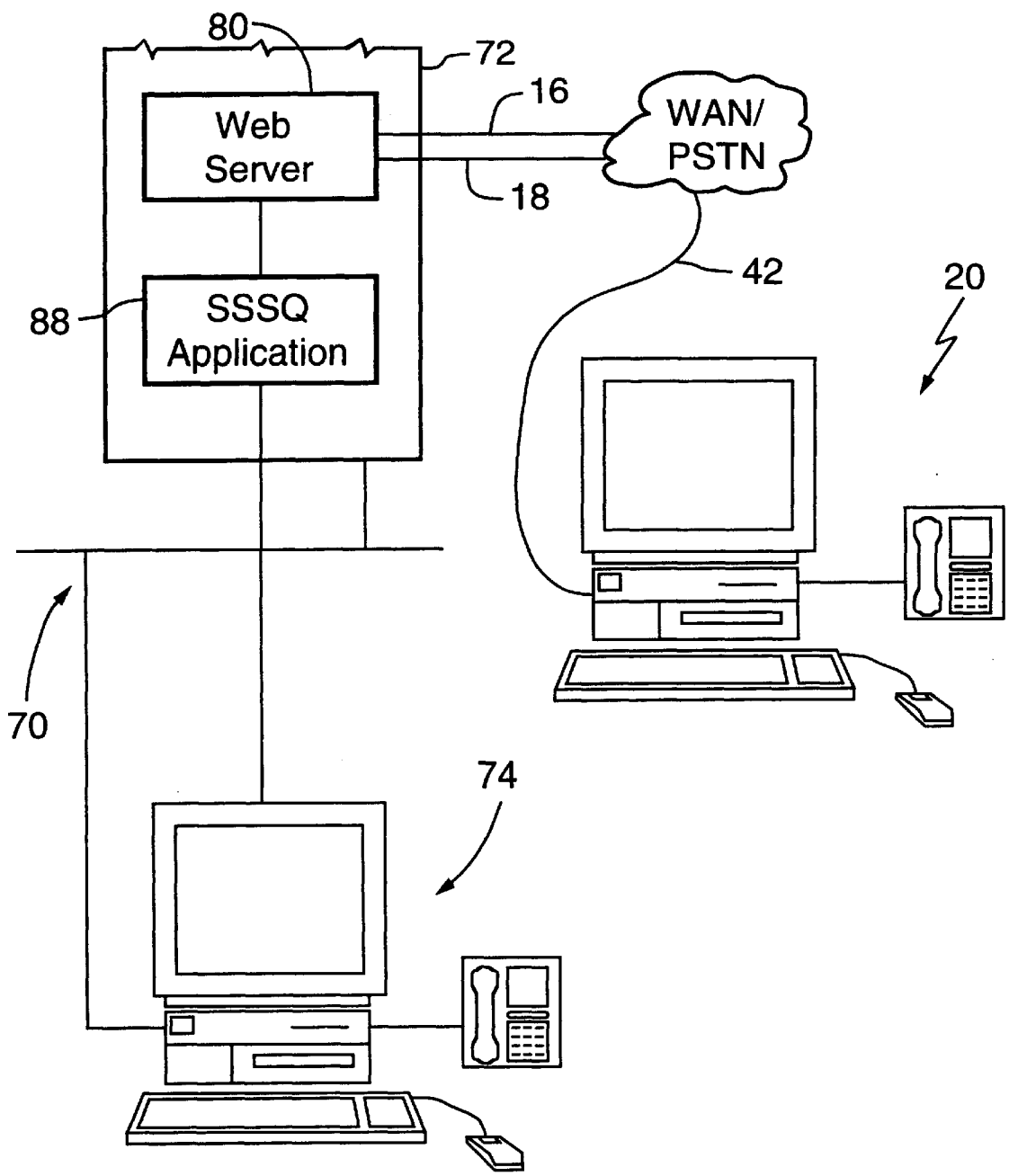
FIG. 3 is a schematic diagram showing links between a web server and a support specialist personal computer.
Figure 4:
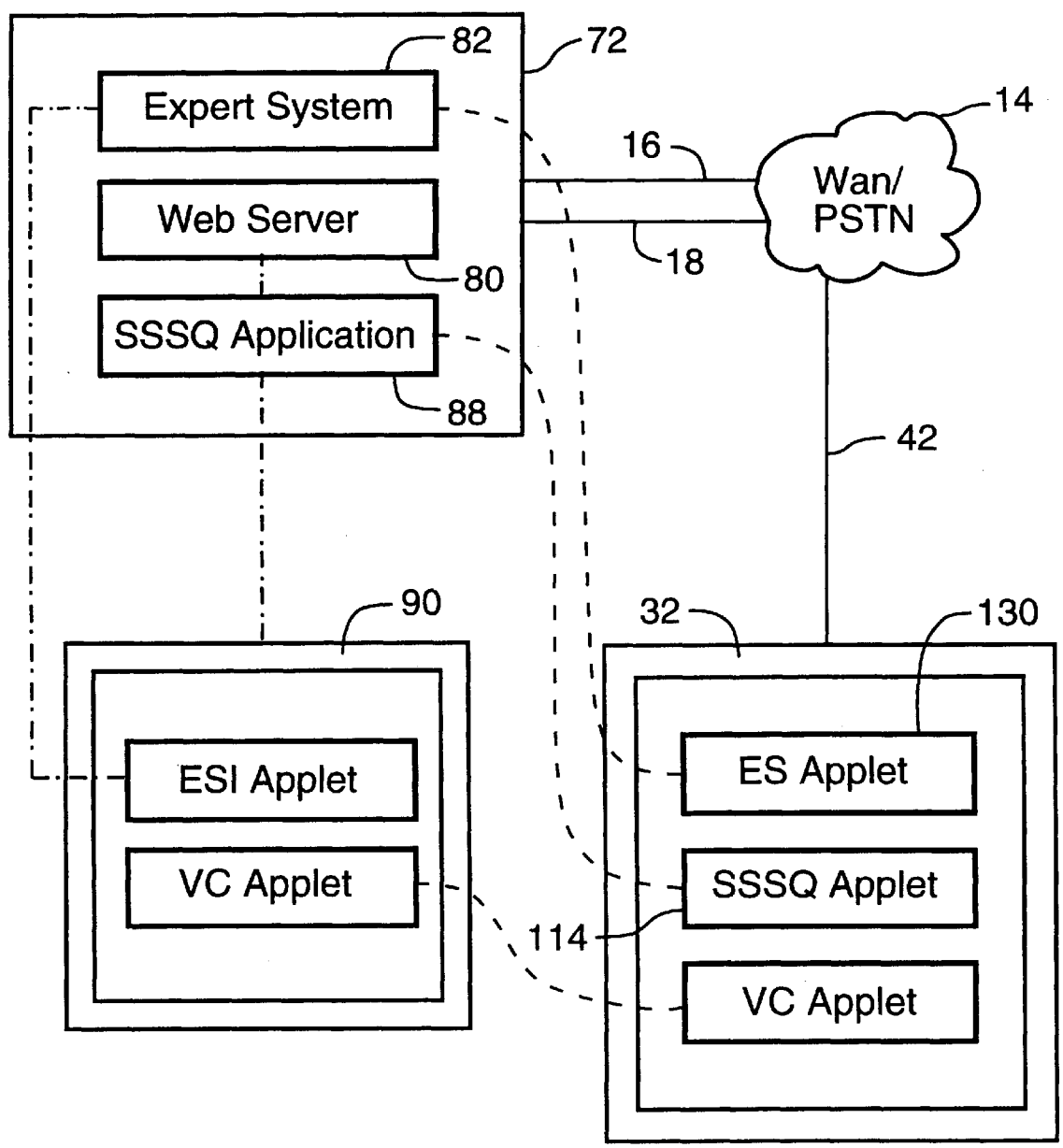
FIG. 4 is a schematic diagram showing links between the web server, the support specialist personal computer and a user personal computer.

The web page 110 also includes links 116 to the personal web pages 118 of each of the support specialists. These personal web pages (one of which is shown in FIG. 2b) include pictures 120 of the support specialists together with detailed biographies including personal and technical information 122 relating to the support specialists.

The web page 110 also includes an ES Java applet 130 selectable by "clicking" on it using a mouse pointer to access the Expert System 82. The ES Java applet once invoked allows a user to input information relating to the user's computer problem(s). The ES Java applet 130 gathers the computer problem information and conveys it to the Expert System 82. The Expert System 82 in turn accesses customer database 86 and the knowledge base 84 to try to diagnose the computer problem. The results of the Expert System's diagnosis can either be presented to the user or to a support specialist as will be described. The ES Java applet 130 also provides a link (not shown) to on-line solution documentation stored in the knowledge base 84. The on-line solution documentation provides solutions to a variety of known computer problems.

If a user at user location 20 requires support to diagnose and solve a computer software or hardware problem, the user through their personal computer 30 accesses the help desk web page 110 via an Internet connection over the WAN/PSTN 14 in a conventional manner. The web server 80 downloads the web page 110 from the web server memory to the personal computer 30 allowing the web page to be displayed on the monitor 34. After the web page is downloaded to the personal computer 30, the user is prompted to enter customer data which is conveyed to the web server 80 and stored in the customer database 86. This customer data is made available to the support specialist if the user and the support specialist are connected. The time at which the web page is accessed is also used to determine the user's priority in the queue if the user elects to be connected to a support specialist by invoking the SSSQ Java applet. Alternatively, the user can be prompted to enter the customer data after the user invokes the SSSQ Java applet 114 and elects to be placed in the queue.

Once the web page 110 is displayed on the monitor of personal computer 30, the user has a number of options. The user can review the support specialist and expertise list presented in information area 112 to determine which support specialist appears to be best suited to diagnose and solve the user's computer problems. If desired, the user can access the personal web pages 118 of one or more of the support specialists by "clicking" on the appropriate links 11 6, to familiarize themselves with the support specialists.

If the user decides to be connected to a support specialist, the user "clicks" on the SSSQ Java applet 114 using the mouse pointer 36. When the SSSQ Java applet is invoked, the user is prompted to select a particular support specialist if desired. If no specific support specialist is entered, the SSSQ Java applet 114 conveys the entered information to the SSSQ application 88 by way of the web server 80. If the specific support specialist selected by the user is available or if no specific support specialist was selected and a support specialist is available and no other users are waiting in the queue, the SSSQ application 88 prompts the web server 80 to open a socket connection between the available support specialist's personal computer 74 and the user computer 30.

However, if no support specialist is available or if a queue exists, the SSSQ application 88 places the user in the queue so that the user will be connected to the next available support specialist when they reach the top of the queue. If a specific support specialist is entered, the user is placed in the queue for that specific support specialist.

Once a connection between a support specialist personal computer 74 and a user computer is terminated, the SSSQ application 88 waits for a predetermined amount of time to elapse before prompting the web server 80 to connect the support specialist personal computer 74 to the user at the top of the queue. The SSSQ application 88 generally continuously monitors the status of the support specialists via socket connections between the SSQ application 88 and the support specialist personal computers 74 as well as the queue and generally continuously updates the SSSQ Java applet 114 so that up-to-date information concerning the queue and support specialists status is presented to users accessing the web page 110.

After a connection between a support specialist personal computer 74 and user computer is made, a text interface is established to allow data to be exchanged between the support specialist and the user over the Internet. Also, the web server 80 downloads a VC Java applet 160 onto both the user computer 30 and the support specialist personal computer 74. The VC Java applet 160 when invoked causes the web server 80 to open a socket connection between the support specialist personal computer 74 and the user computer 30 to allow a voice conversation to take place between the user and the support specialist using the telephones 38 and 96. In this manner, the support specialist can talk the user through the computer problem in an attempt to diagnose and solve the problem.

If the user wishes to make use of the Expert System 82 while they are in the queue waiting for a connection to a support specialist to be made or just wishes to use the Expert System, the user can "click" on the ES Java applet 130. Once invoked, the ES Java applet prompts the user to enter information concerning the computer problem to be diagnosed and solved. The information gathered by the ES Java applet 130 is sent back to the web server 80 and is conveyed to the Expert System 82. The Expert System then gathers any historical computer problem data in the customer database 86 for the user and analyses the computer problem information. Using its knowledge base 84, the Expert System tries to find matches between the analyzed computer problem and known computer problems stored in the knowledge base. If the quality of a match is high, the Expert System 82 conditions the web server 80 to download an HTML page stored in the knowledge base 84 to the user. The HTML page includes suggestions to deal with the computer problem. If the quality of the matches is not high, the Expert System 82 conditions the web server to download information to the user providing suggestions on where to look in the knowledge base on-line solution documentation for a potential solution to the computer problem.

If the user connects to a support specialist after using the Expert System 82, the information gathered by the Expert System and the results of the Expert System's diagnosis are provided to the support specialist by way of an ESI Java applet 180 so that the information can be viewed by the support specialist when a connection between the support specialist and user is made. Matches found by the Expert System are presented to the support specialist in a list in order from the most severe diagnosis to the least severe diagnosis. Information conveyed to the user by the support specialist via the text interface is recorded by the Expert System 82 and stored in the knowledge base 84 for the sake of learning. The information is also stored in the computer database 86. The Expert System learns new cases based on information input by the users, actions taken by the support specialists and feedback from the user concerning the results of the suggestions made by the Expert System and the support specialist.

If during the help session, the support specialist determines that another support specialist is better suited to handle the session, the ESI Java applet 180 is forwarded to the new support specialist and a connection between the new support specialist and the user is established.

If a user at user location 22 establishes a connection with the help desk 12 a similar process is performed. However, since the user location 22 does not include a telephone connected to the personal computer 50 via a USB but rather has a stand alone telephone 58, once a connection is made between the support specialist personal computer 74 and the user computer 50, if a phone connection is to be established it is done so over the PSTN 14. In this case, the support specialist retrieves the telephone number of the user from the customer database 86 and dials the number to establish a conventional voice connection with the user. If a telephone connection cannot be established, another applet can be loaded onto the support specialist personal computer 74 and the user's personal computer 50 to allow text to be delivered back and forth between the support specialist and the user.

As will be appreciated by those of skill in the art, the web based help desk of the present invention provides a remote user with information to solve a computer problem basically as soon as a computer connection is made to the help desk. The user can be connected to a selected one or any available support specialist and/or access an Expert System. A text interface can be established between the support specialist and the user and/or a voice connection can be established to allow data to be exchanged.

Although a particular embodiment of the present invention has been described, those of skill in the art will appreciate that variations and modifications may be made without departing from the spirit and scope thereof as defined by the appended claims.

We claim:

1. A web based help desk comprising:
a web server having memory for storing a help desk web page, said web server allowing remote user computers to access said web server via an Internet or Intranet connection and to access and display said web page;
a plurality of support specialists operating computers in communication with said web server to allow said support specialists to communicate with user computers requiring support, said support specialists being selectable by said user computers via said web page; and
a support specialist status application monitoring the status of said support specialists and user computers requesting support and prompting said web server to establish a connection between a support specialist computer and a user computer when a support specialist becomes available.

2. A web based help desk as defined in claim 1 further including an Expert System including a knowledge base to diagnose computer problems based on problem information gathered from user computers, said Expert System being selectable by user computers via said web page.

3. A web based help desk as defined in claim 2 wherein said web page includes an applet presenting status information concerning said support specialists and the number of users in a queue seeking access to said support specialists, said applet being updated by said support specialist status application to provide current support specialist status and queue information.

4. A web based help desk as defined in claim 3 wherein said web page presents information concerning the area of expertise of each of said support specialists, said applet allowing a user to select a specific support specialist.

5. A web based help desk as defined in claim 4 wherein said web page further includes links to personal web pages of said support specialists, said personal web pages presenting detailed biographical information concerning said support specialists.

6. A web based help desk as defined in claim 5 wherein each of said personal web pages presents a picture and detailed personal and technical information of a support specialist.

7. A web based help desk as defined in claim 2 wherein said web page includes a second applet selectable to allow a user computer to access said Expert System, said second applet prompting users to enter computer problem information and forwarding gathered information to said Expert System for processing.

8. A web based help desk as defined in claim 1 wherein said support specialists and users further establish voice communication connections after said computer connections have been established.

9. A web based help desk as defined in claim 8 wherein said voice communication connections are established over a public switched telephone network.

10. A web based help desk as defined in claim 8 wherein said voice communication connections are established between said support specialist computers and said user computers over Internet or Intranet connections, said voice communication connections being initiated by selection of third applets presented to said support specialists and user computers.

11. A web based help desk as defined in claim 7 wherein said Expert System provides said support specialist with the information gathered from said user and diagnoses made by said Expert System when a user computer and support specialist establish a computer connection.

12. A web based help desk as defined in claim 11 wherein said gathered computer problem information is provided to said support specialist in the form of a fourth applet.

13. A web based help desk as defined in claim 12 wherein said fourth applet is transferable between support specialists.

14. A web based help desk as defined in claim 13 wherein said Expert System transmits diagnosis information to said user when said Expert System has high confidence that said diagnosis is correct.

15. A help desk web page comprising:
support specialist information areas presenting expertise information concerning said support specialists;
a first applet presenting support specialist status and queue information, said applet being updated to provide current support specialist status and queue information and selectable by a user to allow said user to select a support specialist and/or enter said queue; and
a selectable Expert System applet, said Expert System applet gathering user computer problem information when selected by said user.

16. A method of providing support to a user computer at a remote location over the Internet or Intranet comprising the steps of:
providing a web server having memory for storing a help desk web page, said web server allowing remote user computers to access said web page by way of an Internet or Intranet connection;
providing a plurality of support specialists operating computers in communication with said web server to communicate with user computers requiring support, said support specialists being selectable by way of said web page;

monitoring the status of said support specialists and user computers requesting support via said web page and establishing a socket connection between a support specialist computer and a user computer via said web server when a support specialist becomes available; and providing an Expert System including a knowledge base to diagnose computer problems based on gathered computer problem information, said Expert System being accessible by user computers over said Internet or Intranet connection via said web page.

17. The method of claim 16 further comprising the steps of presenting status information concerning said support specialists and the number of users in a queue seeking access to said support specialist; and updating said status information generally continuously.

18. The method of claim 17 further comprising the step of establishing a voice communication connection between a support specialist and a user to supplement the connection between the support specialist personal computer and the user computer.

\* \* \* \* \*